(No Model.)

W. FOX.
Manufacture of Stemmed Articles of Glassware.

No. 240,685.  Patented April 26, 1881.

Witnesses,
R. H. Whittlesey
C. L. Parker

Inventor William Fox,
By Attorney George H. Christy

UNITED STATES PATENT OFFICE.

WILLIAM FOX, OF STEUBENVILLE, OHIO.

MANUFACTURE OF STEMMED ARTICLES OF GLASSWARE.

SPECIFICATION forming part of Letters Patent No. 240,685, dated April 26, 1881.

Application filed February 25, 1881. (No model.)

*To all whom it may concern:*

Be it known that I, WILLIAM FOX, of Steubenville, county of Jefferson, State of Ohio, have invented or discovered a new and useful Improvement in Manufacture of Stemmed Articles of Glassware; and I do hereby declare the following to be a full, clear, concise, and exact description thereof, reference being had to the accompanying drawings, making a part of this specification, in which—like letters indicating like parts—

Figure 1:
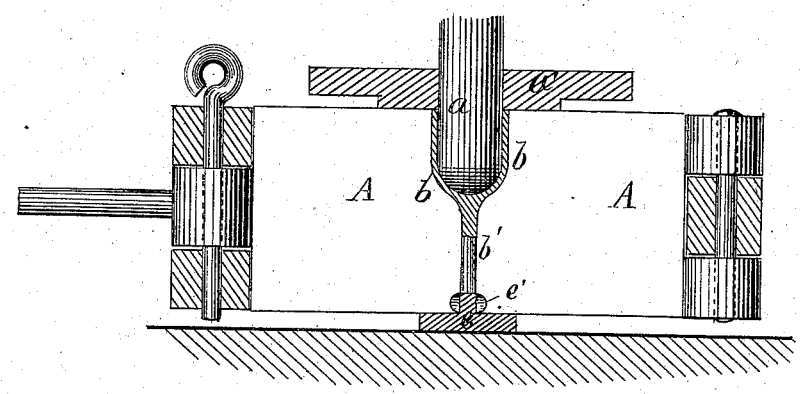
Figure 2:
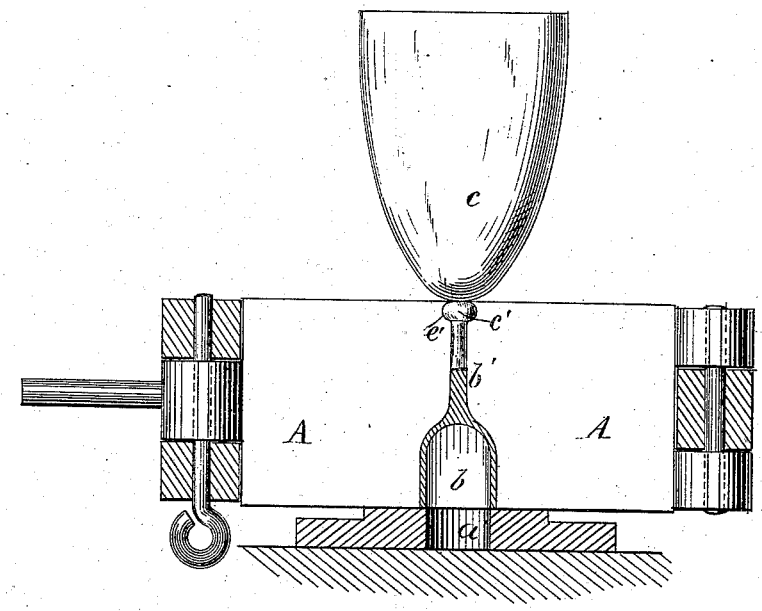

Figures 1 and 2 are sectional views of a glass mold and parts of a stemmed article of glassware, the latter being shown in sectional elevation and arranged with relation to the mold in such manner as to illustrate my invention.

In making stemmed articles of glassware it is convenient and customary to form the bowl and foot in separate pieces, with the stem on one such part, or parts of the stem on both the bowl and foot, and by a subsequent operation unite the parts at the end or ends of the stem.

The purpose of my present invention is to provide for effecting the union of the bowl to the end of the stem in such manner as to involve as little handling of the article as possible, and to require but little time or skill in securing a workmanlike job with proper alignment of the parts of the article when united. This is done as follows: The foot $b$ and stem $b'$ of the desired article are formed in one piece by pressing in a divided or part mold, A. This is done in the usual way of doing such work, the mold being provided with plunger $a$, ring $a'$, and other usual appliances.

It is customary to arrange a removable punta, $e$, in the bottom of such molds. Such punta, or rather the cavity $e'$ which it occupies, I make use of in the following way: The inner end of the punta is made with the inner opening of its cavity $e'$ to conform to the size and shape of the adjacent end of the stem, so that by withdrawing such punta the full end of the stem will be exposed, and will form, in effect, the bottom of a new mold-cavity, $e'$.

For the purposes of pressing the foot and stem it is only necessary that the inner opening of cavity $e'$ be closed by the punta. Consequently the side walls of this cavity or hole may be given any desired form and depth. The foot and stem being formed in such a mold, the mold is turned up side down on the press, or on a convenient table, the punta $e$ is removed, the cavity which it occupied is then filled quite full, by the workman or an attendant, with melted glass $c'$, and the base of bowl $c$, previously formed of any desired shape, either by blowing or pressing, is pressed down upon the open mouth of cavity $e'$, thereby compressing the melted glass within such cavity, causing it to fill and take the form of the mold, and in so doing the hot glass, coming in contact with the end of the previously-formed stem and with the base of the bowl, will fuse thereto and form a solid and complete union between such parts. When this uniting part $c'$ has sufficiently cooled, the mold A is opened and the article is removed to be treated and finished in the usual way.

By this method of uniting the bowl and stem the uniting part $c'$ may be given any desired form in harmony with the design of the article by properly shaping the cavity $e'$; also, the bottom face of the mold will serve as a convenient guide to bring the bowl and stem in proper line, so that a comparatively unskilled hand can do this work with accuracy and uniformly good results.

If desired, any suitable and well-known guides may be employed for directing the bowl as it is pressed upon the mouth of the cavity, or this may be done by a power device.

Several forms of mechanism adapted to do such work by obvious adaptation in construction are known in the art, and need not be described particularly.

The work of joining the bowl and stem can be done in this way very quickly and much better than when the foot and stem are removed from the mold and the parts are separately handled and brought together, as heretofore; also, by properly shaping the cavity $e'$, which may be done as desired without injury to the mold for the purposes of pressing the foot and stem, as above described, any desired form may be given to the surface of the glass used to unite the bowl and stem.

So far as I am aware it is new with my present invention to remove the punta from the mold after the foot and stem have been formed and while the article is still in the mold, thus exposing the end of the stem at the bottom of a new mold-cavity, within and by means of which the molten glass which unites the bowl and stem is confined and given form.

The advantages secured by my improvement, when estimated for a large manufacture, are considerable and important, not only as respects the quality of work obtained thereby, but also as respects economy in time and class of labor required.

By rounding the base of the bowl, or making a slight elevation thereon, such part may be made to enter, more or less, the open end or mouth of the punta-cavity $e'$, and thereby secure greater or more perfect compression of the molten glass therein.

It will be within the usual skill of glass-workers to regulate the quantity of molten glass put into cavity $e'$, so as to secure the proper amount for the purpose required.

It will be understood, of course, that the cup-shaped foot $b$ is to be opened out and finished after the article is removed from the mold; but for the purposes of the present invention the foot may be pressed in other desired form.

My invention is applicable not only to goblets, as shown, but also to the various classes of stemmed articles made of glass, and whether the bowl be formed by blowing or pressing.

I am aware that it is old in the art to form the foot and stem of an article in one piece in a mold, and while such parts are still in the mold to uncover the end of the stem and blow the bowl of the article thereon; but such method of manufacture does not embody my invention, and involves a different method of uniting the bowl and stem.

I claim as my invention—

The method herein described of forming stemmed glassware, consisting in first pressing the foot and stem of the article in a divided mold, such mold having the end of the stem-cavity closed or partially filled with a removable punta; second, removing the punta and filling the cavity which it occupied with molten glass, the foot and stem being still in the mold; and, third, pressing the base of a previously-formed bowl upon or into the molten glass in the open end or mouth of the punta-cavity, substantially as set forth.

In testimony whereof I have hereunto set my hand.

WILLIAM FOX.

Witnesses:
    JOSEPH CONLEY,
    GEORGE G. BRIGHT.